(12) United States Patent
Liu et al.

(10) Patent No.: US 12,156,532 B2
(45) Date of Patent: Dec. 3, 2024

(54) PEANUT WHOLE-PROCESS PRODUCTION LINE AND METHOD

(71) Applicants: QINGDAO UNIVERSITY OF TECHNOLOGY, Shandong (CN); RESEARCH INSTITUTE OF AGRICULTURAL MECHANIZATION, XINJIANG ACADEMY OF AGRICULTURAL SCIENCES, Xinjiang (CN); HENAN UNIVERSITY OF SCIENCE AND TECHNOLOGY, Henan (CN)

(72) Inventors: Mingzheng Liu, Qingdao (CN); Changhe Li, Qingdao (CN); Xinping Li, Qingdao (CN); Xiangdong Liu, Qingdao (CN); Huimin Yang, Qingdao (CN); Yanbin Zhang, Qingdao (CN); Xiaoming Wang, Qingdao (CN); Yali Hou, Qingdao (CN)

(73) Assignees: QINGDAO UNIVERSITY OF TECHNOLOGY, Shandong (CN); RESEARCH INSTITUTE OF AGRICULTURAL MECHANIZATION, XINJIANG ACADEMY OF AGRICULTURAL SCIENCES, Xinjiang (CN); HENAN UNIVERSITY OF SCIENCE AND TECHNOLOGY, Henan (CN)

( * ) Notice: Subject to any disclaimer, the term of this patent is extended or adjusted under 35 U.S.C. 154(b) by 696 days.

(21) Appl. No.: 17/600,331

(22) PCT Filed: May 9, 2020

(86) PCT No.: PCT/CN2020/089378
§ 371 (c)(1),
(2) Date: Sep. 30, 2021

(87) PCT Pub. No.: WO2021/208161
PCT Pub. Date: Oct. 21, 2021

(65) Prior Publication Data
US 2022/0312821 A1    Oct. 6, 2022

(30) Foreign Application Priority Data

Apr. 13, 2020  (CN) .......................... 202010285224

(51) Int. Cl.
*A23N 5/01* (2006.01)
*A23N 5/00* (2006.01)
(Continued)

(52) U.S. Cl.
CPC ............... *A23N 5/01* (2013.01); *A23N 5/002* (2013.01); *A23N 12/08* (2013.01); *B02C 9/00* (2013.01);
(Continued)

(58) Field of Classification Search
CPC .......... A23N 12/08; A23N 5/002; A23N 5/01; B65B 1/22; B65B 1/24; B65B 1/06; B65B 1/32
See application file for complete search history.

(56) References Cited

U.S. PATENT DOCUMENTS 3,242,958 A * 3/1966 Swart ...................... A23N 5/01
99/603
4,091,534 A * 5/1978 Ayotte ..................... A47J 17/14
30/120.2
(Continued)

FOREIGN PATENT DOCUMENTS

CN    201860709 U    6/2011
CN    203262230 U    11/2013
(Continued)

OTHER PUBLICATIONS

Jan. 8, 2021 International Search Report issued in International Patent Application No. PCT/CN2020/089378.
(Continued)

*Primary Examiner* — Thien S Tran
(74) *Attorney, Agent, or Firm* — JCIPRNET

(57) ABSTRACT

The present disclosure provides a peanut whole-process production line and a method. The peanut whole-process production line includes a peanut cleaning system, a shell breaking system, a skin removing system, a peanut kernel
(Continued)

classification system, an ultra-fine pulverization system and a classification packaging system; a first procedure is cleaning and impurity removal of peanuts, breaking of peanut shells is performed after the cleaning and impurity removal of peanuts, removal of peanut kernel skins and ultra-fine pulverization of the peanut shells are respectively performed after the breaking of peanut shells, classification of peanut kernels is performed after the removal of peanut kernel skins, and classification packaging of ultra-fine peanut shell powder is performed after the ultra-fine pulverization of the peanut shells; whole-process processing of peanuts is completed by using the peanut whole-process production line, and peanut resources are fully utilized.

9 Claims, 13 Drawing Sheets

(51) Int. Cl.
    *A23N 12/08*    (2006.01)
    *B02C 9/00*     (2006.01)
    *B65B 1/06*     (2006.01)
    *B65B 1/22*     (2006.01)
    *B65B 1/32*     (2006.01)

(52) U.S. Cl.
    CPC .................. *B65B 1/06* (2013.01); *B65B 1/22* (2013.01); *B65B 1/32* (2013.01)

(56) References Cited

U.S. PATENT DOCUMENTS

| | | | | |
|---|---|---|---|---|
| 5,245,918 A | * | 9/1993 | Volk, Sr. ................. | A23N 5/00 99/623 |
| 5,404,809 A | * | 4/1995 | Ham ....................... | A23N 5/00 30/120.2 |

FOREIGN PATENT DOCUMENTS

| | | | | |
|---|---|---|---|---|
| CN | 104004585 | A | | 8/2014 |
| CN | 105852155 | A | | 8/2016 |
| CN | 107243400 | A | * | 10/2017 |
| CN | 206676751 | U | | 11/2017 |
| CN | 206882171 | U | | 1/2018 |
| CN | 107751926 | A | | 3/2018 |
| CN | 110257159 | A | * | 9/2019 |
| CN | 110604321 | A | | 12/2019 |
| JP | H11-206357 | A | | 8/1999 |
| WO | 2017/205010 | A1 | | 11/2017 |

OTHER PUBLICATIONS

Jan. 8, 2021 Written Opinion issued in International Patent Application No. PCT/CN2020/089378.

Mar. 10, 2021 Office Action issued in Chinese Patent Application No. 202010285224.7.

* cited by examiner

PEANUT WHOLE-PROCESS PRODUCTION LINE AND METHOD

TECHNICAL FIELD

The present disclosure belongs to the technical field of processing of agricultural products, and specifically relates to a peanut whole-process production line and a method.

BACKGROUND

The description in this section merely provides background technology information related to the present disclosure and does not necessarily constitute the prior art.

Peanuts, known as longevity nuts, are also known as groundnuts. In recent years, with continuous progress of science and technology and rapid development of the modern food processing industry, the nutritional value and medicinal value of the peanuts have received more and more attention from people. Processing and utilization as well as market demands of the peanuts in countries all over the world are constantly changed in a general trend that the processing amount and the market demands of the peanuts are constantly increased, the proportion of the peanuts for eating is increased, and the proportion of the peanuts for oil extraction is reduced.

At present, the peanut product processing industry has a relatively low technical level, low technological innovation ability, insufficient deep processing and few researches on comprehensive utilization of peanut products, especially comprehensive utilization of wastes; a lot of byproducts such as peanut meal, peanut skins and peanut shells are produced during processing of the peanuts, the utilization rate is low; however, these byproducts are rich in nutrients such as phenols, proteins and sugars, and an existing processing technology generally only contains or focuses on preliminary extraction of the peanuts.

SUMMARY

In order to solve the problems above, the present disclosure provides a peanut whole-process production line and a method. The present disclosure integrates the functions of cleaning and impurity removal of peanuts, breaking of peanut shells, removal of peanut skins, classification of peanut kernels, ultra-fine pulverization of the peanut shells, classification packaging of ultra-fine peanut shell powder and the like; effective processing and utilization of each part of the peanuts can be completed until the peanut kernels, the peanut skins and the ultra-fine peanut shell powder are obtained, and peanut resources are fully utilized.

According to some embodiments, the present disclosure adopts the following technical solutions:

A peanut whole-process production line and a method, which includes a peanut cleaning system, a shell breaking system, a skin removing system, a peanut kernel classification system, an ultra-fine pulverization system and a classification packaging system.

The peanut cleaning system includes a feeding port and a vibration screening device, and the vibration screening device at least includes a first discharging port for discharging peanut pods and a second discharging port for discharging impurities.

The shell breaking system includes a spiral shell breaking device, is connected with the first discharging port through a first transmission mechanism, and at least includes two discharging ports, a third discharging port is configured to discharge peanuts with skins, and a fourth discharging port is configured to discharge peanut shells.

A second transmission mechanism is arranged between the skin removing system and the third discharging port.

The peanut kernel classification system includes a first feeding device and a conveying screening device, and the first feeding device is connected with an outlet of the skin removing system.

The ultra-fine pulverization system includes a second feeding device, a pulverization device and a classification device distributed sequentially, and the second feeding device is connected with the fourth discharging port.

The classification packaging system receives ultra-fine peanut shell powder processed by the ultra-fine pulverization system and is configured to screen and package the ultra-fine peanut shell powder.

The production line above, distributed according to processing procedures of parts of peanuts, is configured to perform cleaning and impurity removal of peanuts, breaking of peanut shells, removal of peanut kernel skins, ultra-fine pulverization of the peanut shells, classification of skin-removed peanut kernels and classification packaging of ultra-fine peanut shell powder; whole-process processing of the peanuts is completed, and peanut resources are fully utilized.

As an alternative embodiment, the peanut cleaning system includes a first conveying device, a winnowing device and a vibration screening device distributed sequentially, and the first conveying device is configured to intermittently convey materials to the winnowing device.

The winnowing device is configured to perform negative pressure adsorption on light impurities in the materials when the materials slide down onto the vibration screening device under the action of gravity.

The vibration screening device includes multiple stages of screen meshes and two vibration motors with rotating shafts at a certain angle, the multiple stages of screen meshes are subjected to repeated-rotation vibration as a whole, and the multiple stages of screen meshes are installed at different angles respectively.

As an alternative embodiment, the spiral shell breaking device includes a spiral shell breaking rotor, the periphery of the spiral shell breaking rotor is provided with a grid bar, a spacing between the spiral shell breaking rotor and the grid bar is adjustable and is internally provided with a spiral shell breaking module, and the spiral shell breaking module is configured to squeeze and break peanut shells.

As an alternative embodiment, an output end of the spiral shell breaking device is provided with a first negative pressure adsorption device, and the first negative pressure adsorption device is configured to adsorb peanut shells on a horizontal conveyor belt to separate peanut kernels and the peanut shells.

As an alternative embodiment, the peanut kernel classification system further includes a cleaning screening device, and the conveying screening device includes a conveying screening drum consisting of at least two stages of drums with equal diameters; each stage of drum is uniformly surrounded by a number of round pipes, and gaps between the round pipes of each stage of drum are different; the drum near a feeding port is a first drum, the gap between the round pipes of the first drum is the smallest, and the gap between the round pipes of the latter stage of drum is gradually increased than that between the round pipes of the former stage of drum.

The cleaning screening device is arranged above the conveying screening device; the cleaning screening device undergoes contact beating with the conveying screening drum to achieve cleaning screening of the conveying screening drum.

As an alternative embodiment, the ultra-fine pulverization system includes a second feeding device, a primary pulverization device, a secondary pulverization device and a classification device.

The second feeding device includes a feeding pipeline and a rotating member arranged in the feeding pipeline, and the rotating member is connected with a first driving mechanism.

A feeding port of the primary pulverization device is connected with a tail end of the feeding device, the primary pulverization device includes a pulverization turntable and a lining plate arranged at an outer side of the pulverization turntable, a plurality of inclined impact pulverization blades are distributed on the pulverization turntable, and the pulverization turntable is connected with a second driving mechanism.

The secondary pulverization device is arranged at an upper side of the primary pulverization device and provided with a pulverization chamber, a plurality of nozzles are distributed around the pulverization chamber, and center lines of the nozzles can converge at the same point.

The classification device includes a classification cylinder, the classification cylinder is communicated with the pulverization chamber and located above the pulverization chamber, a turbine classification rotor is arranged in the classification cylinder, a plurality of classification blades are arranged at the circumference of the turbine classification rotor, and the turbine classification rotor is connected with a third driving mechanism.

As an alternative embodiment, a lining plate is distributed on an inner wall of the primary pulverization device, a plurality of arc-shaped grooves are formed in an inner edge of the lining plate, and bulges are formed between adjacent arc-shaped grooves.

A lining plate is arranged on an inner wall of the secondary pulverization device, and a surface of the lining plate is sawtooth-shaped.

The classification device is a centrifugal turbine classification device, which includes a classification cylinder, a turbine classification rotor arranged in the classification cylinder and a driving mechanism, a plurality of classification blades are uniformly distributed at the circumference of the turbine classification rotor, the turbine classification rotor is connected with the driving mechanism through a closed shafting, and a discharging port is formed in an upper part of the classification cylinder.

As an alternative embodiment, a screening device of the classification packaging system includes a classification cavity, the classification cavity includes a cylindrical part and a conical p art at a lower side of the cylindrical part, an air and material inlet and an air inlet are symmetrically and tangentially formed in a middle position of the cylindrical part, a cylindrical screen mesh classification cavity coaxial with the cylindrical part is formed in the cylindrical part, and a classification impeller coaxial with the cylindrical part is arranged in the screen mesh classification cavity.

A weighing mechanism is configured to weigh classified micropowder.

A compaction mechanism is configured to bag and beat the weighed micropowder.

As an alternative embodiment, the skin removing system includes a gas explosion device, a pulling device, a drying device and a second negative pressure adsorption device.

The gas explosion device receives conveyed peanut materials with skins to be removed and is configured to perform gas explosion on the peanut materials under the action of a pressure difference to preliminarily separate peanut kernels and peanut skins.

The pulling device is configured to pull the preliminarily separated peanut kernels and the peanut skins into the drying device.

The drying device is configure to compress outside air to increase the temperature, transfer heat through hot air and heat and dry the preliminarily separated peanut kernels and the peanut skins to fully separate the peanut kernels and the peanut skins.

The second negative pressure adsorption device is configured to respectively collect the fully separated peanut kernels and the skins with different density and quality in a negative pressure adsorption manner.

A peanut whole-process production method includes cleaning and impurity removal of peanuts, breaking of peanut shells, removal of peanut kernel skins, ultra-fine pulverization of the peanut shells, classification of skin-removed peanut kernels and classification packaging of ultra-fine peanut shell powder.

In order to facilitate understanding, generally speaking, cleaning and impurity removal of peanuts and breaking of peanut shells are performed sequentially, removal of peanut kernel skins and classification of peanut kernels are performed sequentially, and ultra-fine pulverization of the peanut shells and classification packaging of ultra-fine peanut shell powder are also performed sequentially, but processing of the peanut shells and processing of the peanut kernels can be performed sequentially or performed separately and simultaneously.

Compared with the prior art, the present disclosure has the following beneficial effects:

(1) According to the peanut whole-process production line in the present disclosure, in an adsorption type multi-stage screening peanut cleaning system, the conveying speed of a lifting hopper is controlled by controlling the rotation speed of a stepping motor to achieve intermittent conveying; a winnowing adsorption device designed based on the principle of a Laval tube performs negative pressure adsorption on light impurities such as dry stems and leaves in materials when the materials slide down onto screen meshes from a slide plate under the action of gravity; a screening device is driven by vibration motors, three layers of screen meshes are designed, installed at different angles, connected by springs to buffer vibration of the screen meshes and connected as a whole to a first rack through bottom springs to provide a fixing support point for vibration, and discharging ports are formed in different positions of the screen meshes.

(2) According to the peanut whole-process production line in the present disclosure, a spiral peanut shell breaking system is combined with a controllable hopper through a conveying belt to realize quantitative conveying of peanuts and achieve the purpose of efficient and precise feeding; a spiral shell breaking rotor is matched with a square grid bar to perform spiral conveying, squeezing and shell breaking on peanuts; a conveyor belt and a first negative pressure adsorption device are used to separate peanut shells and peanut kernels.

(3) According to the peanut whole-process production line in the present disclosure, a peanut and skin intelligent separation device system using a gas explosion method is designed in a negative pressure adsorption type peanut kernel skin removing system based on the principle of gas explosion, the peanut kernels and peanut skins are separated by using physical and mechanical methods without damaging the quality of the peanut kernels and the peanut skins, the materials can be collected, the peanut kernels and the peanut skins can be effectively separated, and the influence on the quality of the peanut kernels and the peanut skins is reduced to the maximum extent.

(4) According to the peanut whole-process production line in the present disclosure, based on pushing of built-in tooth-shaped spiral blades and rotation of a screening drum in a spiral peanut kernel classification system, classification round pipes with different gaps are arranged to perform classification screening on peanut kernel particles according to the particle size. Through screening the peanut kernels by using this device, not only are the conveying speed and classification efficiency improved, the problems such as high labor cost, slow manual screening and high labor intensity are solved, but also uniform peanut kernel particles after classification are ensured, the classification precision is ensured, and the characteristic of being difficult to block is achieved.

(5) According to the peanut whole-process production line in the present disclosure, through the interaction of an impact type mechanical primary pulverization device and a collision type airflow secondary pulverization device, a fluidized bed collision type airflow mechanical peanut shell ultra-fine pulverization system realizes ultra-fine pulverization of the peanut shells, and the pulverization efficiency of the fluidized bed collision type airflow mechanical peanut shell ultra-fine pulverization system is improved. At the same time, peanut shell micropowder obtained after pulverization has good dispersibility and is fine and uniform in particle size.

(6) According to the peanut whole-process production line in the present disclosure, through the interaction of a double-head spiral dispersing conveying device and a high-speed airflow dispersing conveying device based on the principle of a Venturi tube, an ultra-fine peanut shell powder classification packaging system fully disperses combined and agglomerated ultra-fine peanut shell powder; three-time classification of the peanut shell bulk material is realized through high-speed rotation of a symmetrical tangential airflow in a screen mesh classification cavity, separation of the screen meshes and high-speed rotation of a classification impeller; and compaction packaging of the ultra-fine powder is realized by using a quantitative compaction packaging device.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

Figure 1:
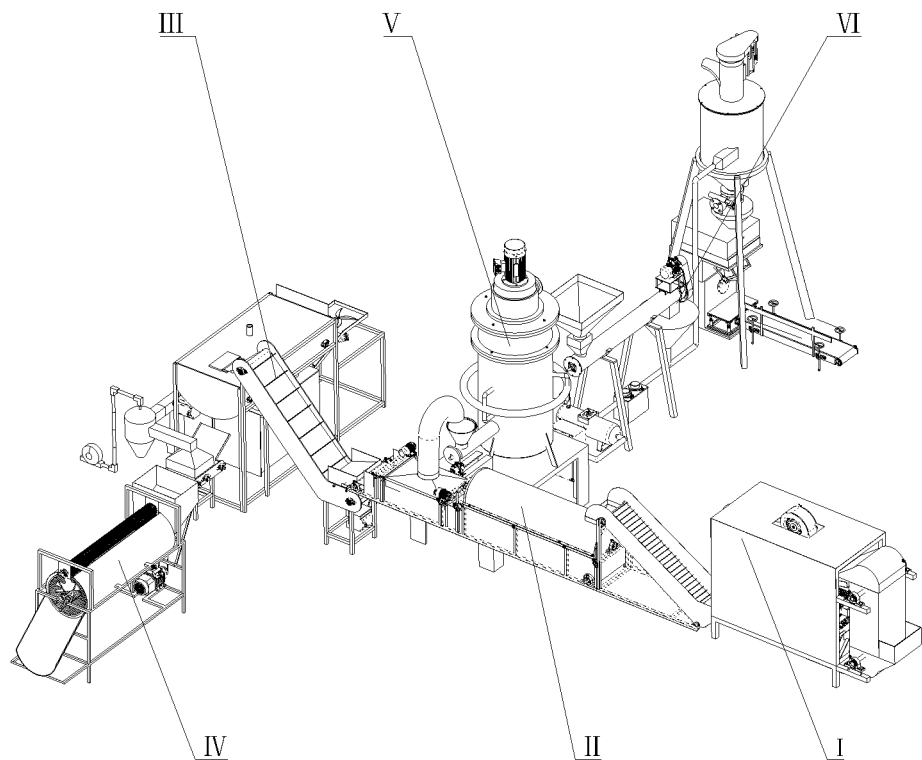
FIG. 1 is a general assembly diagram of a peanut whole-process production line.

In the figures, description of symbols are as follows: I represents adsorption type multi-stage screening peanut cleaning system, II represents spiral peanut shell breaking system, III represents negative pressure adsorption type peanut kernel skin removing system based on the principle of gas explosion, IV represents spiral peanut kernel classification system, V represents fluidized bed collision type airflow mechanical peanut shell ultra-fine pulverization system, and VI represents peanut shell ultra-fine powder classification packaging system.

I-01-first conveying device, I-02-winnowing mechanism, I-03-vibration screening mechanism, I-04-first rack, I-0201-slide plate, I-0202-positive pressure fan, I-0203-adsorption pipeline, I-0301-vibration motor, I-0302-first-stage screen mesh, I-0303-first-stage and second-stage screen mesh connection spring, I-0304-first-stage screen mesh discharging port, I-0305-second-stage screen mesh, I-0306-second-stage and third-stage screen mesh connection spring, I-0307-first discharging port, I-0308-third-stage screen mesh, I-0309-second discharging port, and I-0310-screen mesh support spring.

II-01-first transmission mechanism, II-02-spiral shell breaking device, II-03-first negative pressure adsorption device, II-0201-round top cover, II-0202-spiral shell breaking rotor, II-0203-front round fixing plate, II-0204-rear round fixing plate, II-0205-spiral module fixing bolt, and II-0206-square grid bar.

III-01-second transmission mechanism, III-02-gas explosion device, III-03-pulling device, III-04-drying device, III-05-second negative pressure adsorption device, III-0201-gas explosion generation chamber, III-0202-steam generator connection port, III-0203-gas explosion discharging slide door, III-0204-gas explosion discharging slide rail, III-0205-condensed water discharge and recovery port, III-0206-pressure relief valve connection port, III-0207-gas explosion feeding slide rail, III-0208-gas explosion feeding slide door, III-0209-gas explosion positioning blanking plate, III-0210-gas explosion stainless steel transmission net, III-0211-gas explosion buffer brush, III-0212-gas explosion transmission driven shaft, III-0213-gas explosion transmission net baffle, III-0214-gas explosion transmission driving shaft, III-0401-drying generator, III-0402-drying discharging slide rail, III-0403-drying discharging slide door, III-0404-air energy heat source port, III-0405-drying feeding slide door, III-0406 drying feeding slide rail, III-0407-drying fan, III-0408-drying conveying slide rail, III-0409-drying vibration transmission device, III-0410-drying driving shaft pulley, III-0411-dried skin collection box, III-0412-drying conveying guide rail, III-0413-drying conveying track, III-0414-drying buffer.

IV-01-second rack, IV-02-first feeding device, IV-03-conveying screening device, IV-04-cleaning screening device, IV-0301-classification round pipe, IV-0302-conveying screening drum shaft, IV-0303-built-in tooth-shaped spiral blade, IV-0304-conveying screening drum connection rod, and IV-0304-05-classification round pipe limit groove.

V-01-second feeding device, V-02-impact type mechanical primary pulverization device, V-03-jet type airflow secondary pulverization device, V-04-centrifugal turbine classification device, V-05-third rack, V-0401-fastening bolt module, V-0402-turbine classification rotor shafting module, V-0403-discharging port, V-0404-turbine classification rotor, V-0405-outer cylinder of classification chamber of centrifugal turbine classification device, V-0406-upper sleeve of classification chamber of centrifugal turbine classification device, V-0407-coupler, and V-0408-servo motor.

VI-01-dispersing conveying device, VI-02-cyclone sieve plate classification device, VI-03-quantitative compaction packaging device, VI-0101-storage bin, VI-0102-buffer hopper, VI-0103-spiral conveying cavity, VI-0104-double-head screw rod, VI-0105-double-head screw blade, VI-0106-discharging port, VI-0107-spiral conveying motor, VI-0108-discharging hooper, VI-0109-air compressor, VI-0110-gas storage tank, VI-0111-air dryer, VI-0112-Venturi tube tee, VI-0201-air and material inlet, VI-0202-air inlet, VI-0203-classification cavity, VI-0204-screen mesh, VI-0205-classification impeller, VI-0206-medium powder discharging pipe, VI-0207-coarse powder discharging pipe, VI-0208-fine powder discharging pipe, VI-0301-feeding hopper, VI-0302-weighing mechanism, VI-0303-clamping arm, VI-0304-vibration compaction mechanism, and VI-0305-conveyor belt.

DETAILED DESCRIPTION

The present disclosure is further described below with reference to the accompanying drawings and embodiments.

It should be noted that, the following detailed descriptions are all exemplary, and are intended to provide further descriptions of the present disclosure. Unless otherwise specified, all technical and scientific terms used herein have the same meaning as commonly understood by a person of ordinary skill in the technical field to which the present disclosure belongs.

It should be noted that terms used herein are only for describing specific implementations and are not intended to limit exemplary implementations according to the present disclosure. As used herein, the singular form is also intended to include the plural form unless the context clearly dictates otherwise. In addition, it should further be understood that, terms "include" and/or "include" used in this specification indicate that there are features, steps, operations, devices, components, and/or combinations thereof.

In the present disclosure, orientation or position relationships indicated by the terms such as "upper", "lower", "left", "right" "front", "rear", "vertical", "horizontal", "side", and "bottom" are based on orientation or position relationships shown in the accompanying drawings, and are merely relationship words that are determined for ease of describing the structural relationship between components or elements in the present disclosure, and are not intended to specifically refer to any component or element in the present disclosure. Therefore, such terms should not be construed as a limitation on the present disclosure.

In the present disclosure, terms such as "fixedly connected", "connected", "connected with" and the like are to be understood broadly, meaning that the terms can be either fixedly connected, or integrally connected or detachably connected; can be direct connection, and also can be indirect connection through an intermediate medium. For the relevant scientific research or technical personnel in the art, the specific meaning of the above terms in the present disclosure can be determined according to the specific circumstances and cannot be construed as a limitation on the present disclosure.

As introduced in background, it is found by the inventor that an existing peanut processing production line has an unsatisfactory effect and generally has the disadvantages of high unit energy consumption and low economy. In order to solve the technical problems above, the present application provides a peanut whole-process production line.

The peanut whole-process production line provided in the present application sequentially includes, by procedures, an adsorption type multi-stage screening peanut cleaning system, a spiral peanut shell breaking system, a negative pressure adsorption type peanut kernel skin removing system based on the principle of gas explosion, a spiral peanut kernel classification system, a fluidized bed collision type airflow mechanical peanut shell ultra-fine pulverization system and an ultra-fine peanut shell powder classification packaging system; the adsorption type multi-stage screening peanut cleaning system is arranged at the foremost end of the production line, the spiral peanut shell breaking system is arranged behind the adsorption type multi-stage screening peanut cleaning system, the negative pressure adsorption type peanut kernel skin removing system based on the principle of gas explosion and the fluidized bed collision type airflow mechanical peanut shell ultra-fine pulverization system are respectively, arranged behind the spiral peanut shell breaking system, the spiral peanut kernel classification system is arranged behind the negative pressure adsorption type peanut kernel skin removing system based on the principle of gas explosion, and the ultra-fine peanut shell powder classification packaging system is arranged behind the fluidized bed collision type airflow mechanical peanut shell ultra-fine pulverization system The adsorption type multi-stage screening peanut cleaning system includes a first conveying device arranged on a first rack, a winnowing device and a vibration screening device are arranged on the side of the first conveying device, and the winnowing device is arranged above the first conveying device; the first conveying device is configured to intermittently convey materials to the winnowing device, the winnowing device designed based on the principle of a Laval tube performs negative pressure adsorption on light impurities such as dry stems and leaves in the materials, and then the materials fall into a screening device driven by vibration motors to complete multi-stage vibration screening; and the spiral peanut shell breaking system is arranged behind the adsorption type multi-stage screening peanut cleaning system.

The spiral peanut shell breaking system includes a first transmission mechanism, a spiral shell breaking device is arranged behind the first transmission mechanism, and a first negative pressure adsorption device is arranged behind the spiral shell breaking device; the materials are intermittently conveyed to the spiral shell breaking device by the first transmission mechanism and subjected to squeezing, rubbing and shell breaking in a gap between a spiral shell breaking rotor and a square grid bar, and the materials obtained after shell breaking fall onto a horizontal conveyor belt and are conveyed to the first negative pressure adsorption device; the negative pressure adsorption type peanut kernel skin removing system based on the principle of gas explosion is arranged behind the spiral peanut shell breaking system.

The negative pressure adsorption type peanut kernel skin removing system based on the principle of gas explosion includes a second transmission mechanism, a gas explosion device, a pulling device, a drying device and a second negative pressure adsorption device; a large pressure difference between oversaturated steam in the gas explosion device and the outside is applied to peanut kernels to achieve a gas explosion effect, the moisture content in peanut skins is reduced by using the drying device, and the peanut skins and the peanut kernels are fully separated. Negative pressure adsorption is adopted for adsorption separation according to a density difference between the peanut skins and the peanut kernels; the spiral peanut kernel classification system and the fluidized bed collision type airflow mechanical peanut shell ultra-fine pulverization system are respectively arranged behind the negative pressure adsorption type peanut kernel skin removing system based on the principle of gas explosion.

The spiral peanut kernel classification system includes a second rack and a first feeding device fixed to a front end of the second rack, a conveying screening device is arranged behind the first feeding device, and a cleaning screening device is arranged above the conveying screening device; the peanut kernels enter the conveying screening device through the first feeding device and are classified into multiple levels through round pipes arranged in classification round pipe limit grooves.

The fluidized bed collision type airflow mechanical peanut shell ultra-fine pulverization system includes a second feeding device fixed to a third rack, an impact type mechanical primary pulverization device, a collision type airflow secondary pulverization device and a centrifugal turbine classification device; the second feeding device is arranged at a right side of the impact type mechanical primary pulverization device, the centrifugal turbine classification device is arranged above the collision type airflow secondary pulverization device, and a feeding port and the impact type mechanical primary pulverization device are respectively arranged below the collision type airflow secondary pulverization device; peanut shells are quantitatively fed through the second feeding device, subjected to primary pulverization under the impact of a pulverization turntable rotating at a high speed and an arc-shaped liner in the impact type mechanical primary pulverization device and then enter the collision type airflow secondary pulverization device with an airflow for secondary pulverization, and then particles with small centrifugal force enter the middle of a turbine classification rotor from gaps between classification blades of the turbine classification rotor and are discharged from a discharging port in an upper part; the ultra-fine peanut shell powder classification packaging system is arranged behind the fluidized bed collision type airflow mechanical peanut shell ultra-fine pulverization system.

The ultra-fine peanut shell powder classification packaging system includes a dispersing conveying device, a cyclone sieve plate classification device and a quantitative compaction packaging device; the dispersing conveying device is arranged at a left side of the cyclone sieve plate classification device, and the quantitative compaction packaging device is arranged below the cyclone sieve plate classification device. Ultra-fine peanut shell powder subjected to mechanical dispersing and airflow dispersing in the dispersing conveying device enters the cyclone sieve plate classification device and is then classified into coarse powder, medium powder and fine powder through the cyclone sieve plate classification device, and automatically weighed powder is packaged into bags by using the quantitative compaction packaging device.

Embodiment 1

A peanut whole-process production line disclosed in this embodiment is further described below with reference to FIGS. 1 to 18.

Figure 2:
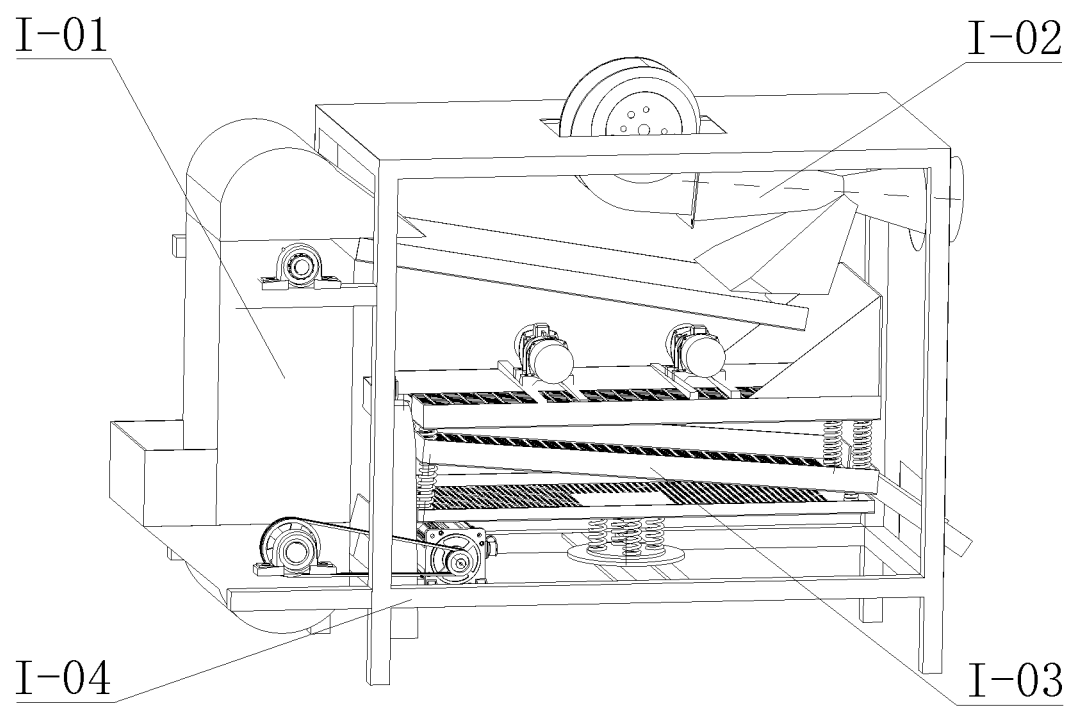
FIG. 2 is an axonometric view of an adsorption type multi-stage screening peanut cleaning system.

An adsorption type multi-stage screening peanut cleaning system is introduced first. With reference to FIG. 2, the adsorption type multi-stage screening peanut cleaning system includes a first conveying device I-01, a winnowing mechanism I-02, a vibration screening mechanism I-03 and a first rack I-04. The first conveying device I-01 is located on the side of the winnowing mechanism I-02 and the vibration screening mechanism I-03, and the winnowing mechanism I-02 is located above the vibration screening mechanism I-03.

The first conveying device I-01 is fixed to the first rack I-04 through an external bearing support of a transmission drum inside the first conveying device, and the winnowing mechanism I-02 is fixed to the first rack I-04 by being fixed to a positive pressure fan through a fixing bolt; residual dry peanut stems and leaves in materials are subjected to adsorption cleaning through the winnowing mechanism and adsorbed out from an adsorption pipeline I-0203 under the action of the positive pressure fan I-0202. The adsorbed materials fall into a first-stage screen mesh I-0302 of the vibration screening mechanism I-03. A screen mesh support disc I-0310 in the vibration screening mechanism is connected with a support disc bottom plate on the first rack through a fixing bolt to fix the vibration screening mechanism to the first rack, and the materials are respectively screened with the first-stage screen mesh I-0302, a second-stage screen mesh I-0305 and a third-stage screen mesh I-0308 and respectively discharged from a first-stage screen mesh discharging port I-0304, a first discharging port I-0307 and a second discharging port I-0309 to complete a screening procedure.

The first conveying device I-01 is driven by a stepping motor, and the transmission drum is driven to rotate through speed reduction of a pulley. The transmission drum drives a conveyor belt and a conveying hopper on the conveyor belt to perform digging type intermittent conveying on the materials. When conveying the materials to a top of the first conveying device, the conveying hopper throws the materials onto a slide plate I-0201 of an adsorption mechanism, and an inclination angle θ of the slide plate is 26.1°-33.02° to ensure that the materials can automatically slide down only under the action of gravity and friction.

Figure 3:
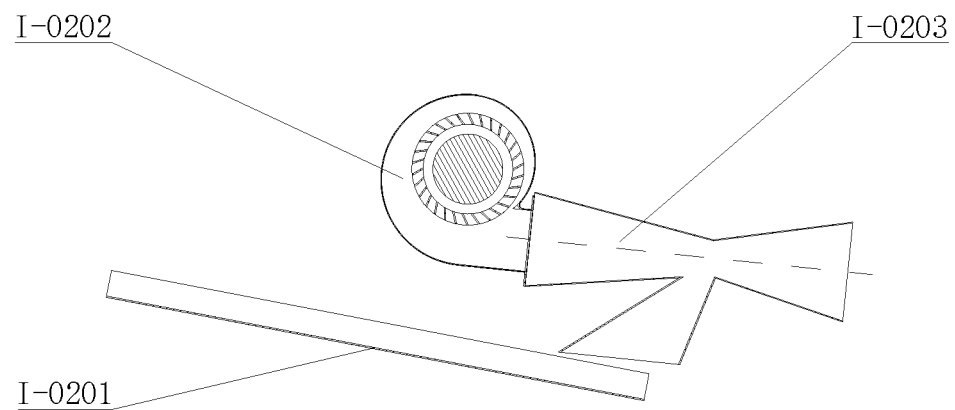
FIG. 3 is a sectional view of a winnowing device in an adsorption type multi-stage screening peanut cleaning system.

With reference to FIG. 3, the adsorption structure consists of the adsorption pipeline I-0203 designed based on the principle of a Laval tube, the positive pressure fan I-0202 and the slide plate I-0201. The adsorption pipeline designed based on the principle of a Laval tube can make the positive pressure fan generate negative pressure suction, due to the design of the adsorption pipeline, it can be ensured that impurities are removed along the pipeline, and damage caused to peanuts by direct adsorption of the fan is avoided. The adsorption pipeline mainly consists of a reducing pipe, an expansion pipe and an extraction pipe; according to a negative pressure adsorption principle of the adsorption pipeline, the reducing pipe is shrunk to a throat junction, the cross-sectional area is gradually reduced, and the speed of an airflow generated by the positive pressure fan is gradually increased; the cross-sectional area of the expansion pipe is gradually increased from the throat junction, and the speed of the airflow can be continuously increased at this time. Without considering the gravitational potential energy, the air pressure is lower when the air speed is higher, so that the air pressure at the throat junction is lower than the atmospheric pressure of the outside, and the air pressure in the expansion pipe is gradually reduced. The pressure at the throat junction is lower than that in an outstretching pipe, a certain suction effect on the airflow in the pipe is achieved, and at this time, negative pressure is formed in the pipe.

Figure 4:
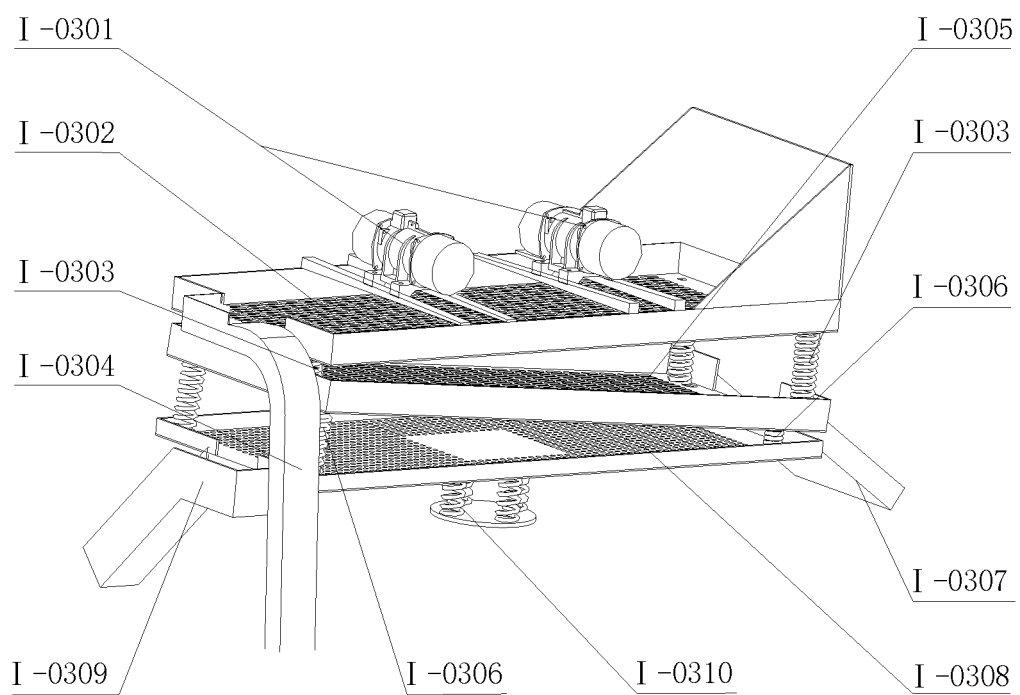
FIG. 4 is an axonometric view of a vibration screening device in an adsorption type multi-stage screening peanut cleaning system.

With reference to FIG. 4, the vibration screening mechanism I-03 is driven by two vibration motors, and the vibration motors drive three stages of screen meshes to screen the materials as a whole. A relative included angle between rotating shafts of the two vibration motors is 40°, and the vibration screening mechanism is driven to perform repeated-rotation vibration. Each stage of screen mesh is connected with a discharging port, so that the screened materials can conveniently fall into the next procedure. The materials slide down from the slide plate I-0201, are received by a slide baffle and then fall into the first-stage screen mesh I-0302, impurity particles larger than peanut pods are filtered out through screening and then fall into a first collection box from the first-stage screen mesh discharging port I-0304, and the peanut pods, shriveled peanuts and small impurity particles fall into the second-stage screen mesh I-0305. The peanut pods are filtered out through screening of the second-stage screen mesh I-0305 and then collected after sliding out from the first discharging port I-0307, and the shriveled peanuts and the small impurity particles fall into the third-stage screen mesh I-0308. The small impurity particles are filtered out through screening of the third-stage screen mesh I-0308 and then collected into a material box by a collecting hopper after falling from the third-stage screen mesh, and the shriveled peanuts slide down to the second discharging port I-0309 from the third-stage screen mesh, so that cleaning of the materials is completed. Each stage of screen mesh is supported by springs to buffer and absorb vibration, so as to prevent that a screening device is inclined too much in a certain direction. A whole vibration screening device is fixed to an upper part of the first rack through a screen mesh support spring I-0310 at the bottom.

Each stage of screen mesh is inclined at a certain angle: the inclination angle of the first-stage and third-stage screen meshes is 0-5°; since the second-stage screen mesh is a main screening layer, with reference to the inclination angle of the slide plate, the inclination angle θ of this stage of screen mesh is 26.1°-33.02°. An amplitude λ of the vibration motors is 2.5 mm, a vibration frequency is 22 Hz, a vibration direction angle β is 30°-60°, and a throwing index D is 4.9. A three-axis size of the peanuts is established, size data of the peanuts is obtained by using an experimental method, and it is determined that a 25×15 mm elliptical plane punching screen is selected for the first-stage screen mesh I-0302, and a 17×6 mm elliptical plane punching screen is selected for the second-stage screen mesh I-0305. A 8 mm circular plane punching screen is selected for the third-stage screen mesh I-0308. Baffles are arranged at the periphery of each stage of screen mesh to prevent the materials from being thrown out during screening.

Figure 5:
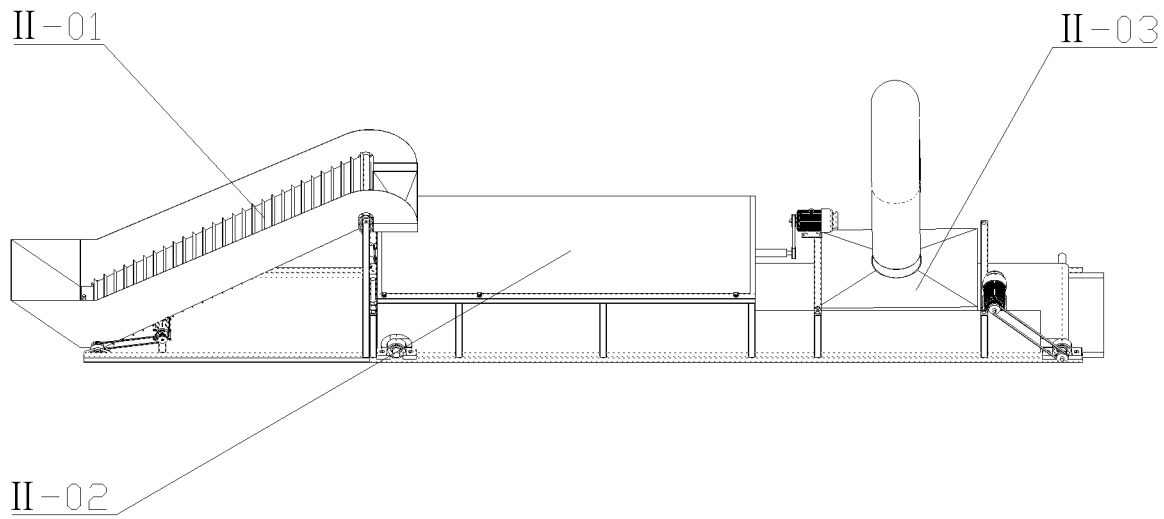
FIG. 5 is an axonometric view of a spiral peanut shell breaking system.
Figure 6:
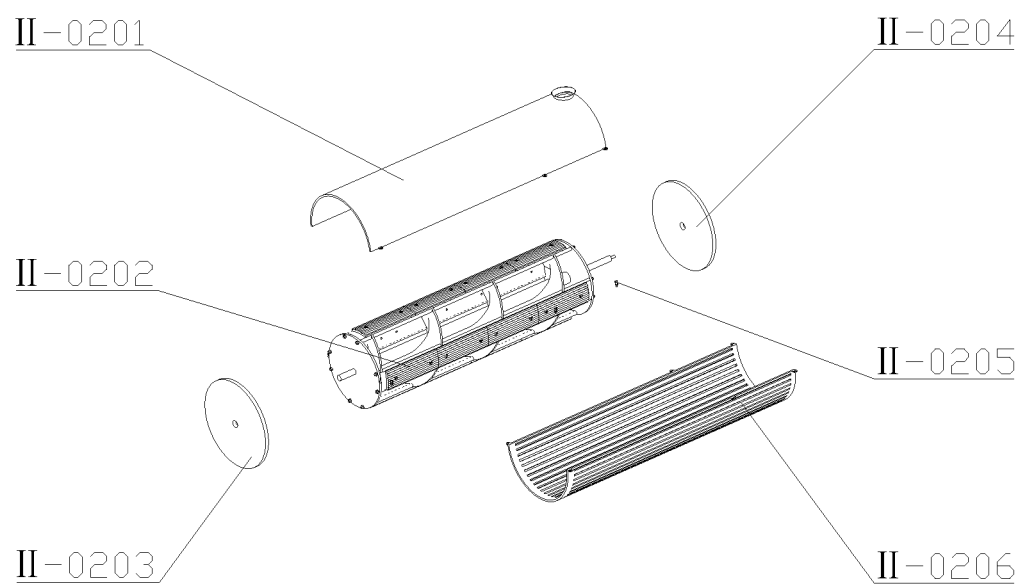
FIG. 6 is an explosive view of a spiral shell breaking device in a spiral peanut shell breaking system.

With reference to FIG. 5, the spiral peanut shell breaking system includes a first transmission mechanism II-01, a spiral shell breaking device II-02 and a first negative pressure adsorption device II-03; the first transmission mechanism II-01 is arranged in front of the shell breaking device II-02, and the first negative pressure adsorption device II-03 is arranged behind the shell breaking device II-02; after classification, the peanuts are sent to the spiral shell breaking device II-02 through the first transmission mechanism II-01, and after performing shell breaking by the spiral shell breaking device II-02, peanut shells and peanut kernels are separated in the first negative pressure adsorption device II-03.

With reference to FIG. 5, the spiral shell breaking device II-02 includes a spiral shell breaking rotor II-0202, and the periphery is fixed by a round top cover II-0201 and a square grid bar II-0206 through a spiral module fixing bolt II-0205 to cover the spiral shell breaking rotor II-0202; by adjusting a horizontal angle of the spiral shell breaking rotor II-0202, a stepless change of spacing can be formed in a gap between the spiral shell breaking rotor II-0202 and the square grid bar II-0206 to perform self-adaptive squeezing and shell breaking on the peanuts of different specifications; a front round fixing plate II-0203 and a rear round fixing plate II-0204 are respectively fixed to the front and rear of the spiral shell breaking rotor II-0202 to fix and support the spiral shell breaking rotor II-0202; at the same time, the rear round fixing plate II-0204, the round top cover II-0201 and the square grid bar II-0201 form a sealing structure to prevent leakage of the peanuts, and there is a space between the front round fixing plate II-0203 and the square grid bar II-0201, so that the peanuts obtained after shell breaking can leak out from the front.

Figure 7:
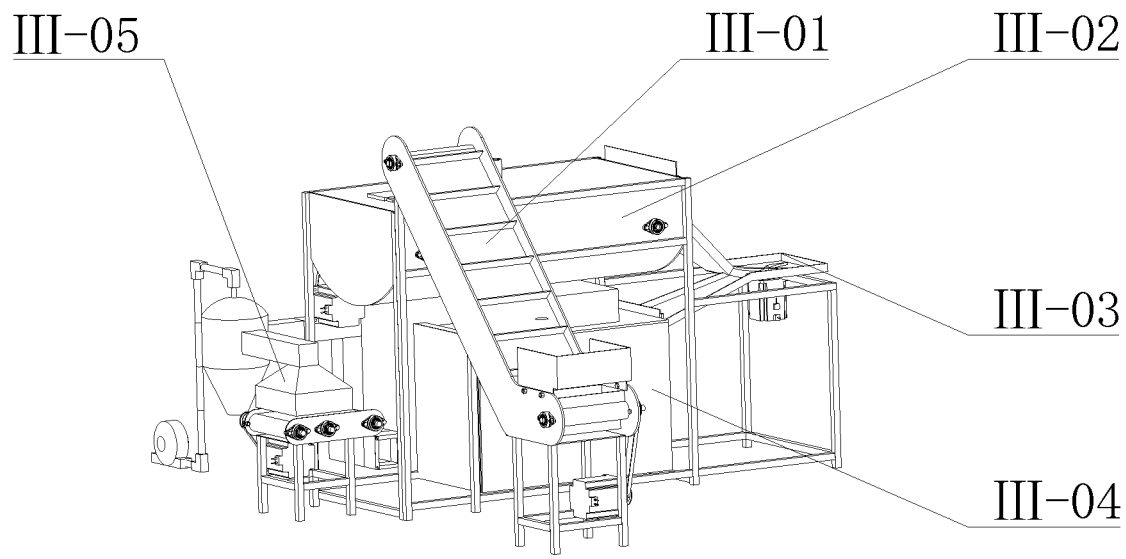
FIG. 7 is an axonometric view of a negative pressure adsorption type peanut kernel skin removing system based on the principle of gas explosion.
Figure 8:
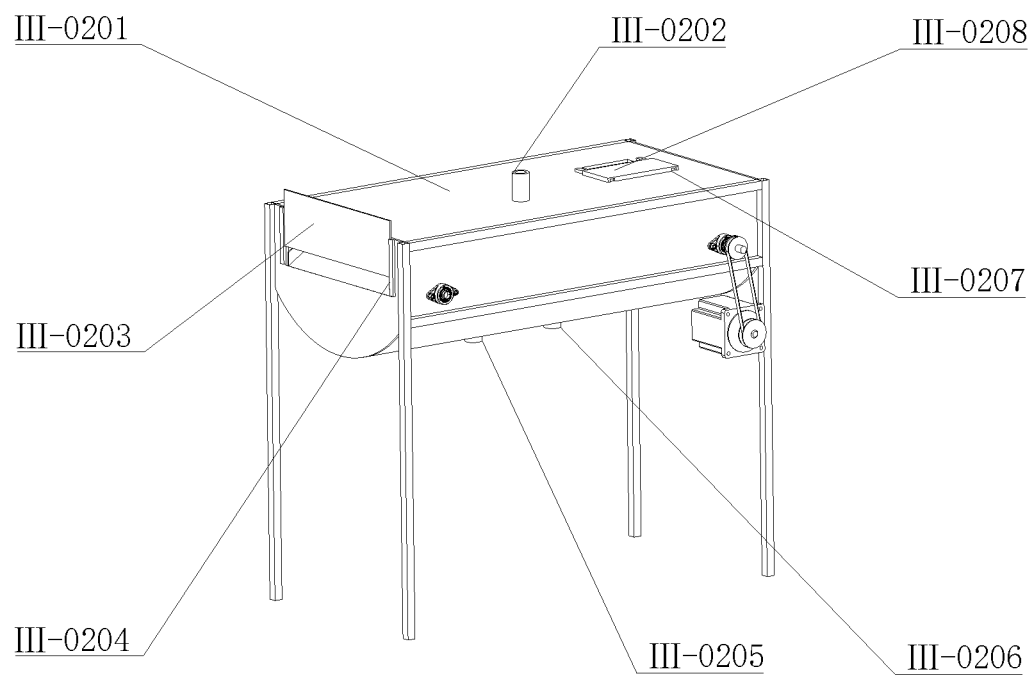
FIG. 8(a) is an axonometric view of an outer side of a steam device in a negative pressure adsorption type peanut kernel skin removing system based on the principle of gas explosion.
FIG. 8(b) is an axonometric view of an inner side of a steam device in a negative pressure adsorption type peanut kernel skin removing system based on the principle of gas explosion.
Figure 8:
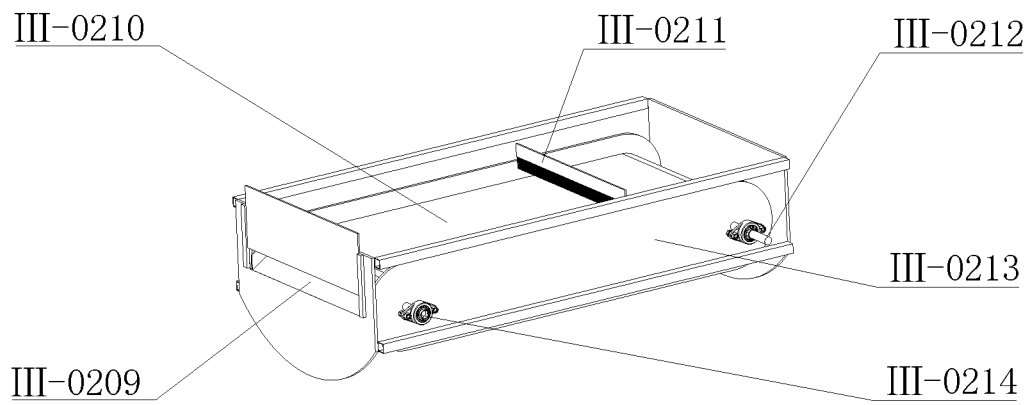
Figure 9:
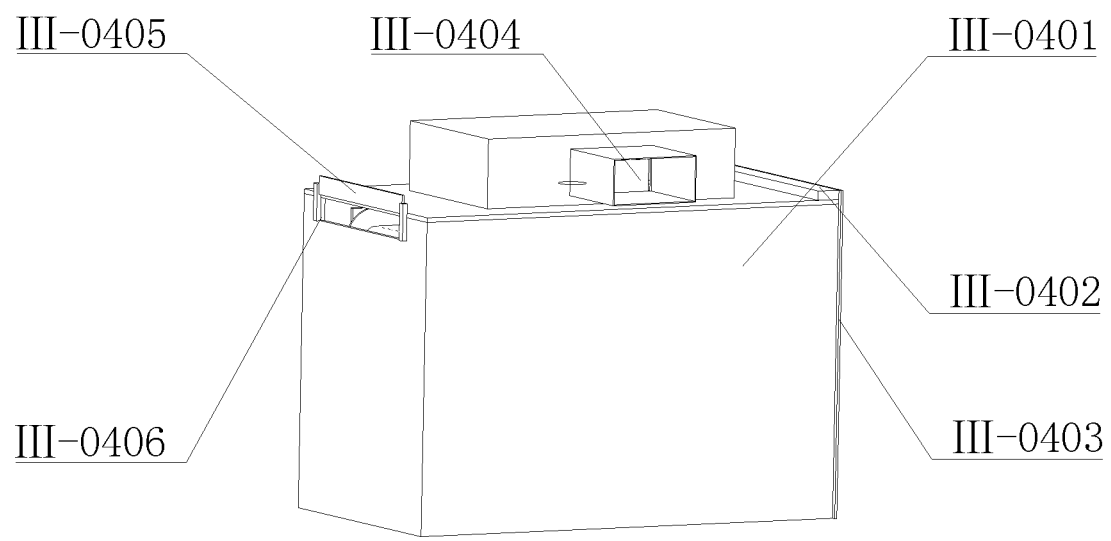
FIG. 9(a) is an axonometric view of an outer side of a heating chamber in a negative pressure adsorption type peanut kernel skin removing system based on the principle of gas explosion.
FIG. 9(b) is an axonometric view of an inner side of a heating chamber in a negative pressure adsorption type peanut kernel skin removing system based on the principle of gas explosion.
Figure 9:
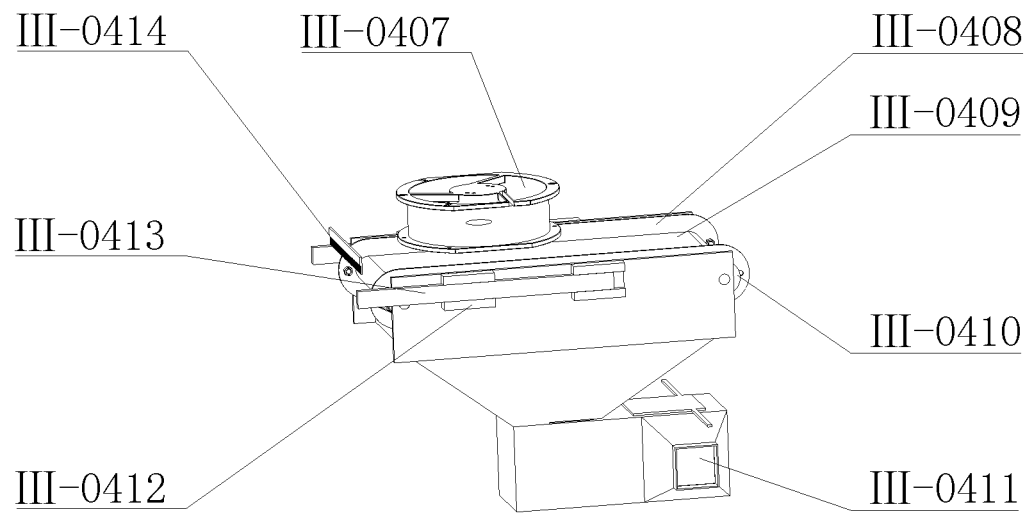

With reference to FIG. 7, a second transmission mechanism III-01, a gas explosion device III-02, a pulling device III-03, a drying device III-04 and a second negative pressure adsorption device 11I-05 are included.

The second transmission mechanism achieves feeding by using a feeding device, feeding operation of a flexible conveyor belt is performed by an inner slope, and due to the arranged slope of the feeding device, the peanuts are buffered during falling. A conveying driving shaft is driven by a conveying stepping motor to perform conveying operation of the flexible conveyor belt, the peanuts at a tail end of the flexible conveyor belt slide down to a subsequent procedure through a conveying slide plate, and due to the existence of the conveying slide plate, damage caused to the peanuts in a subsequent processing device is reduced. As shown in FIG. 8(a), the gas explosion device III-02 includes a gas explosion generation chamber III-0201, which is provided with a steam generator connection port III-0202 and connected with a steam generator to generate steam, and is further provided with a condensed water discharge and recovery port to connect with a subsequent air energy heat pump to facilitate recovery of condensed water, so that high economic benefits are achieved; in addition, a pressure relief valve connection port III-0206 is also provided, and rapid pressure relief treatment is performed through pressure relief operation, so that peanut skins are broken due to a pressure difference; with reference to FIG. 8(b), a gas explosion buffer brush III-0211 and a gas explosion stainless steel transmission net III-0210 are arranged in the gas explosion generation chamber III-0201. A gas explosion feeding slide door III-08 and a gas explosion feeding slide rail III-07 move, the materials are conveyed to the gas explosion stainless steel transmission net III-0210 through the conveying slide plate, accumulation of the peanut kernels is avoided by the buffer brush III-0211, and damage caused to the peanut kernels is reduced. The steam generator is connected with the steam generator connection port III-0202 to fully infiltrate the surfaces of the peanuts, and then the pressure relief valve connection port III-0206 is used to realize gas explosion of the peanut skins due to pressure difference. In this way, the peanut skins and the peanut kernels are separated. After a gas explosion process is completed, the materials fall into a subsequent processing device through the cooperation between a discharging slide door III-0203 and a discharging slide rail III-0204. The materials are fed by using a pulling feeding mechanism, and pulling blades are driven to rotate by a pulling driving motor to make the materials enter a next process from a pulling discharging mechanism. By controlling the rotation speed of the pulling driving motor, the feeding rate of the materials can be better controlled. With reference to FIG. 9(a), the peanut kernels are fed through a drying feeding slide rail III-0406 and a drying feeding slide door III-0405 and conveyed to a drying vibration transmission device III-0409, and a part of separated skins enter a dried skin collection box III-0411. In a drying process, the air energy heat pump is connected with an air energy heat source port III-0404 to provide heat, and a drying fan III-0407 is used for transferring the heat. After the drying process is completed, the materials are handed over to a subsequent device through the cooperation between a drying discharging slide rail III-0402 and a drying discharging slide door III-0403 and the cooperation between a drying conveying guide rail III-0412 and a drying conveying track III-0413. In the handover process, the dried skin collection box III-0411 is blocked by a drying sealing plate to form a closed loop, so that subsequent skin collection operation is facilitated. The materials enter the second negative pressure adsorption device through handover with the drying device III-04, and the dried skin collection box performs handover with a first negative pressure collection mechanism; due to a negative pressure effect of a negative pressure fan, an airbag on the first negative pressure collection mechanism is shrunk inward, so that a pipeline is closed, and a suction loss during negative pressure adsorption is reduced. The materials are conveyed by a negative pressure transmission device, and secondary skin collection operation is performed by using a secondary negative pressure collection device. The materials enter a storage unit through a negative pressure pipeline, and an upper part of the storage unit is provided with an iron net to prevent incomplete collection of the skins.

Figure 10:
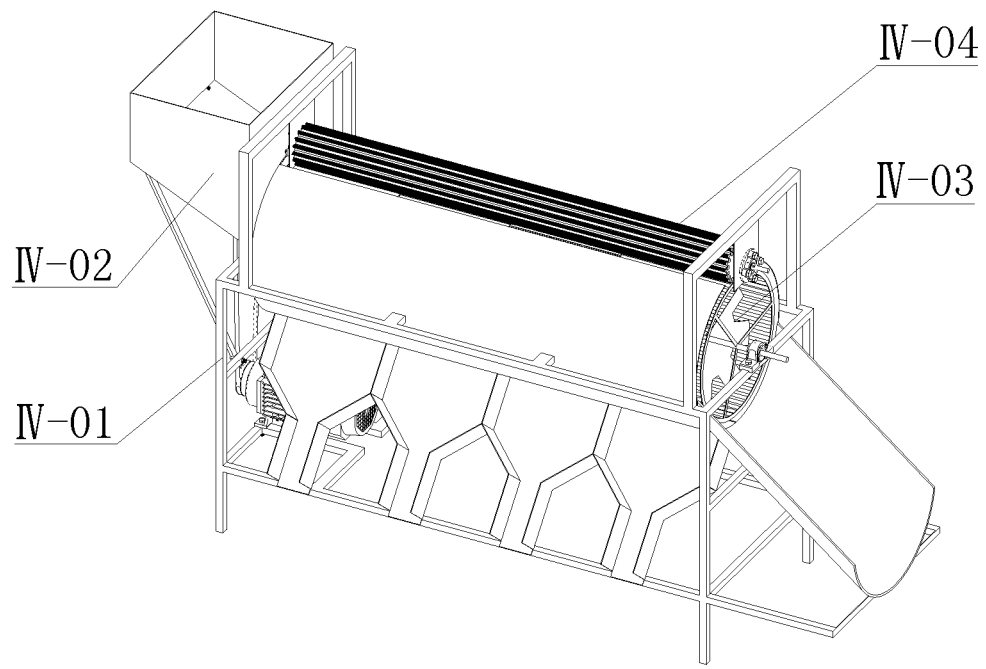
FIG. 10 is an axonometric view of a spiral peanut kernel classification system.

With reference to FIG. 10, a spiral pushing drum type peanut kernel classifier consists of four parts including a second rack IV-01, a first feeding device IV-02, a conveying screening device IV-03 and a cleaning screening device IV-04.

Figure 11:
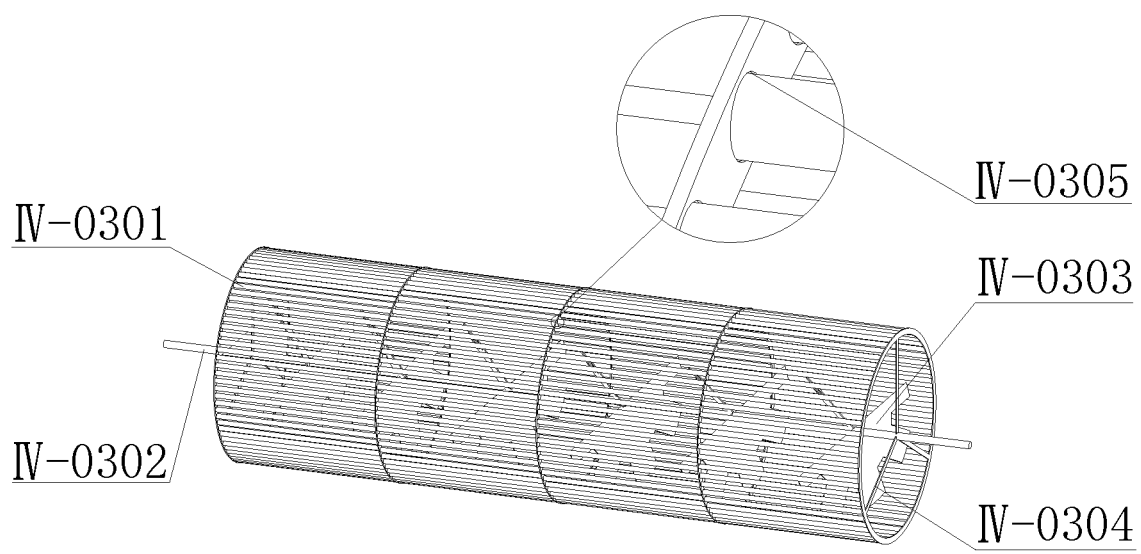
FIG. 11 is an axonometric view of a classification device in a spiral peanut kernel classification system.

The first feeding device IV-02 is located obliquely above the conveying screening device IV-03, the cleaning screening device IV-04 is located directly above the conveying screening device IV-03, and discharging ports of all stages are formed in a lower part of the conveying screening device IV-03. A feeding hopper is fixed to the second rack IV-01 by a feeding hopper fixing rod, the conveying screening device IV-03 is fixed to the second rack IV-01 by a conveying screening drum fixing bearing through a conveying screening drum shaft IV-0302, an outer covering cylinder is arranged at the outer side of the conveying screening device IV-03, and the discharging ports of all stages are formed in the lower side. The cleaning screening device IV-04 is located directly above the conveying screening device IV-03, penetrates through cleaning screening beating roller fixing plates at two ends by a cleaning screening beating roller rotating shaft, and then is fixed to the second rack IV-01 by a cleaning screening beating roller fixing bearing. As shown in FIG. 2, the spiral pushing drum type peanut kernel classifier is powered by a frequency conversion motor, and transmission is achieved through the cooperation among a driving pulley, a belt and a driven pulley. As shown in FIG. 11, built-in tooth-shaped spiral blades IV-0303 are arranged in the conveying screening device IV-03, and the built-in tooth-shaped spiral blades IV-0303 are installed on the conveying screening drum shaft IV-0302; 4 sections of classification round pipes IV-0301 with different gaps are arranged at the periphery of the conveying screening device IV-03, and the conveying screening drum shaft IV-0302 is welded and fixed to the classification round pipes IV-0301 by conveying screening drum connection rods IV-0304. As shown in FIG. 7, classification round pipe limit grooves with a diameter 0.6 mm greater than that of a classification round pipe are formed in junctions at the two ends of each section of the classification round pipe IV-0301 on the conveying screening device IV-03, so that the classification round pipes horizontally move randomly in an error range of ±0.3 mm to realize flexible screening of the peanut kernels.

Figure 12:
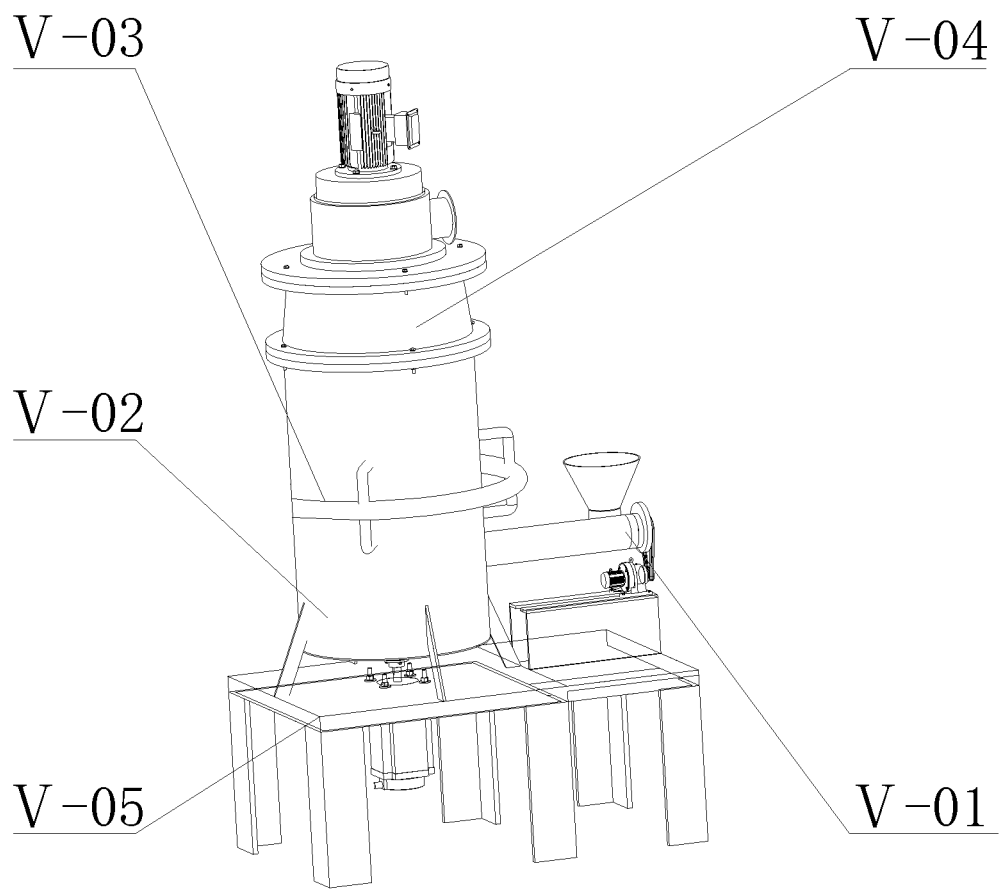
FIG. 12 is an axonometric view of a fluidized bed collision type airflow mechanical peanut shell ultra-fine pulverization system.
Figure 13:
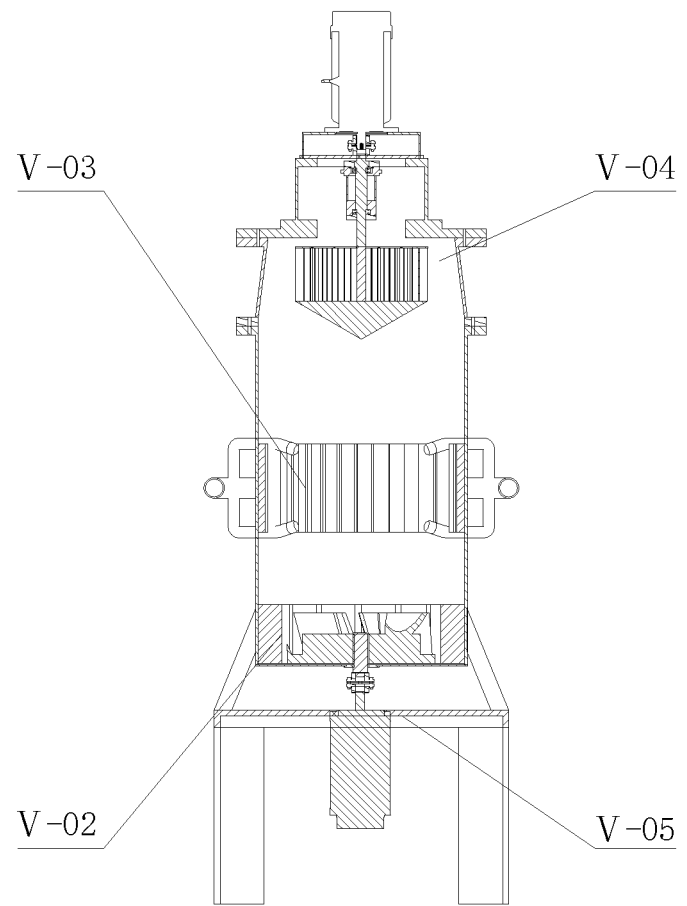
FIG. 13 is a sectional view of a fluidized bed collision type airflow mechanical peanut shell ultra-fine pulverization system.

With reference to FIG. 12 and FIG. 13, the fluidized bed collision type airflow mechanical peanut shell ultra-fine pulverization system consists of a second feeding device V-01, an impact type mechanical primary pulverization device V-02, a jet type airflow secondary pulverization device V-03, a centrifugal turbine classification device V-04 and a third rack V-05. The second feeding device is arranged at a right side of the impact type mechanical primary pulverization device, the centrifugal turbine classification device is arranged above the collision type airflow secondary pulverization device, and a feeding port and the impact type mechanical primary pulverization device are respectively arranged below the collision type airflow secondary pulverization device.

A feeding cylinder of the second feeding device V-01 is welded and fixed to an outer cylinder wall of the impact type mechanical primary pulverization device V-02, and the second feeding device is driven by a stepping motor fixed to the third rack V-05, so as to control the feeding rate of the peanut shells. A pulverization turntable of the impact type mechanical primary pulverization device V-02 is driven to rotate at a high speed by a three-phase stepping motor at the bottom, and primary ultra-fine pulverization of the peanut shells is completed under the impact and collision of the pulverization turntable and an arc-shaped lining plate of the impact type mechanical primary pulverization device V-02; the peanut shells obtained after primary ultra-fine pulverization are driven to enter the jet type airflow secondary pulverization device V-03 by inclined pulverization blades on the pulverization turntable of the impact type mechanical primary pulverization device V-02, upper and lower layers of Laval nozzles are distributed on an inner cylinder wall of the jet type airflow secondary pulverization device V-03, the peanut shells obtained after primary ultra-fine pulverization are fluidized under the action of a supersonic airflow generated by the Laval nozzles, and accelerated peanut shell particles are converged at intersections of the Laval nozzles, violently impacted and collided and then subjected to secondary ultra-fine pulverization. Fine peanut shell powder obtained after secondary ultra-fine pulverization moves with an airflow to the upper centrifugal turbine classification device V-04, a turbine classification rotor of the centrifugal turbine classification device V-04 rotates at a high speed, classification screening of the fine peanut shell powder is completed based on a difference in the centrifugal force of the fine peanut shell powder, ultra-fine peanut shell powder meeting pulverization requirements is discharged from a discharging port, and the ultra-fine pulverization procedure of the peanut shells is completed.

Figure 14:
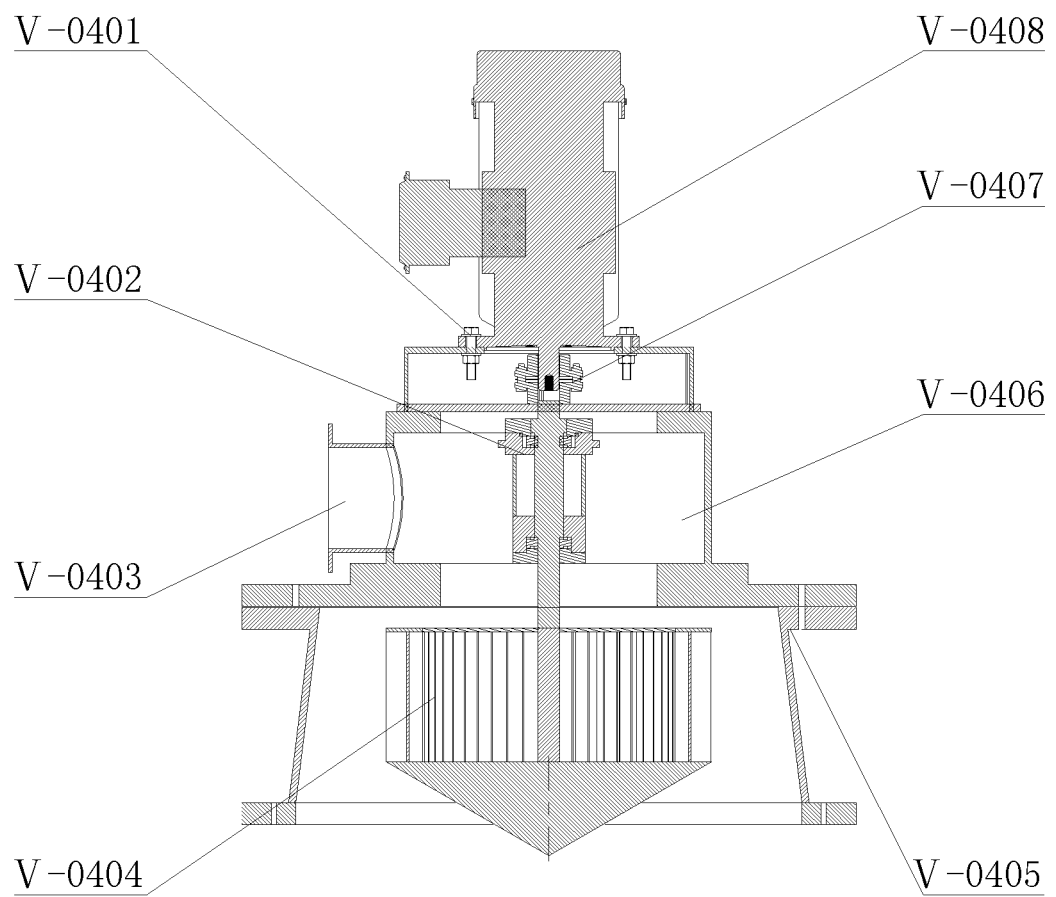
FIG. 14 is a sectional view of a centrifugal turbine classification device in a fluidized bed collision type airflow mechanical peanut shell ultra-fine pulverization system.

With reference to FIG. 14, an upper sleeve V-0406 of a classification chamber of the centrifugal turbine classification device is fixedly connected with an outer cylinder V-0405 of the classification chamber of the centrifugal turbine classification device by a fastening bolt, the outer cylinder V-0405 of the classification chamber of the centrifugal turbine classification device is reduced upward by 7°, and the reason is that since an airflow gradually enters a classification zone during axial movement, the flow rate of the axial airflow in the classification zone is reduced. Due to the reduction of the axial airflow in the classification zone, the particles are partially separated in the classification zone and are nonuniform in particle concentration and particle size in upper and lower regions of the classification zone, and the outer cylinder V-0405 of the classification chamber of the centrifugal turbine classification device which is reduced upward by 7° can ensure the uniformity of the axial airflow in the classification zone, so that the gas-solid concentration and particle size distribution are uniform in the upper and lower regions of the classification zone, and the classification precision is improved. A servo motor V-0408 of the centrifugal turbine classification device V-04 is fixed to an upper part of the upper sleeve V-0406 of the classification chamber of the centrifugal turbine classification device by a fastening bolt module V-0401. The turbine classification rotor V-0404 is connected with the servo motor V-0408 through a turbine classification rotor shafting module V-0402 and a coupler V-0407, and centrifugal turbine classification of the ultra-fine peanut shell powder is realized.

Figure 15:
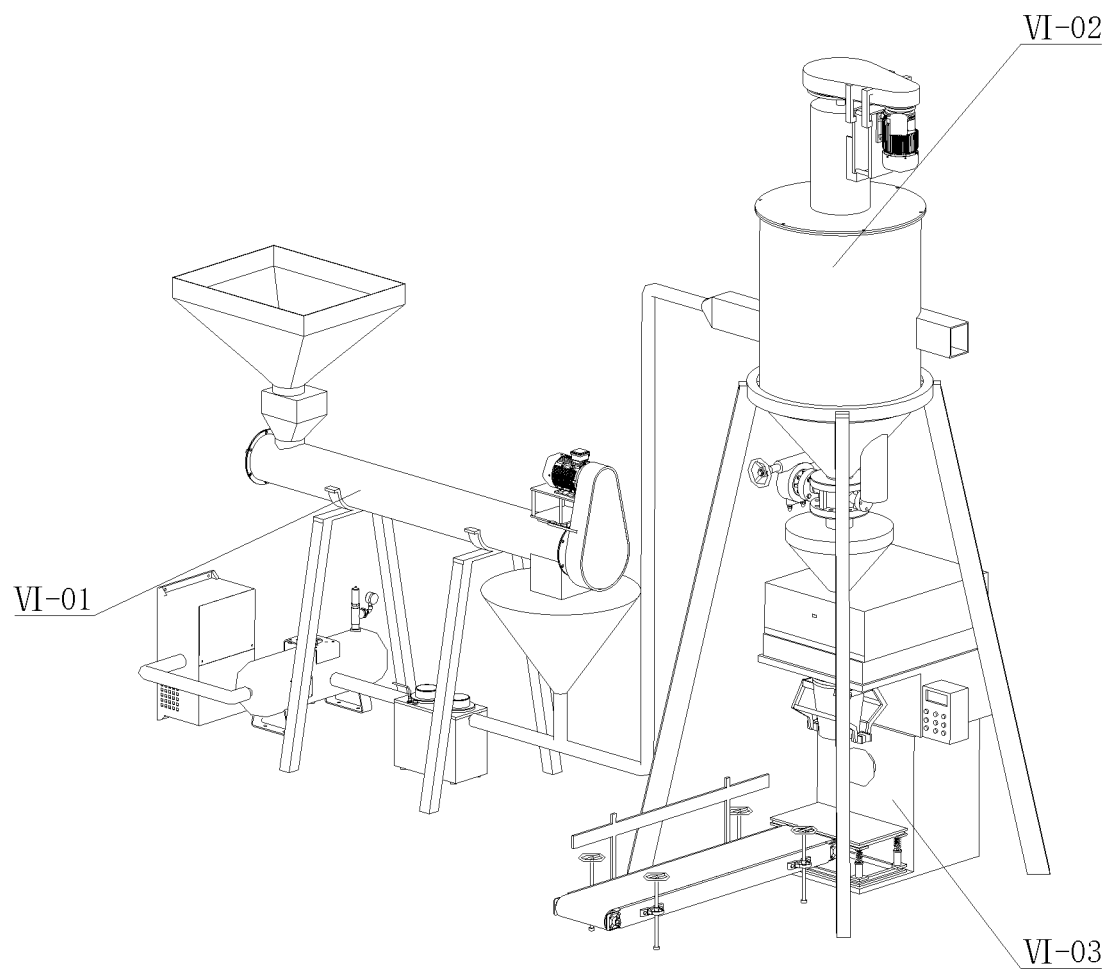
FIG. 15 is an axonometric view of a peanut shell ultra-fine powder classification packaging system.

With reference to FIG. 15, the ultra-fine peanut shell powder classification packaging system includes a dispersing conveying device VI-01, a cyclone sieve plate classification device VI-02 and a quantitative compaction packaging device VI-03.

Figure 16:
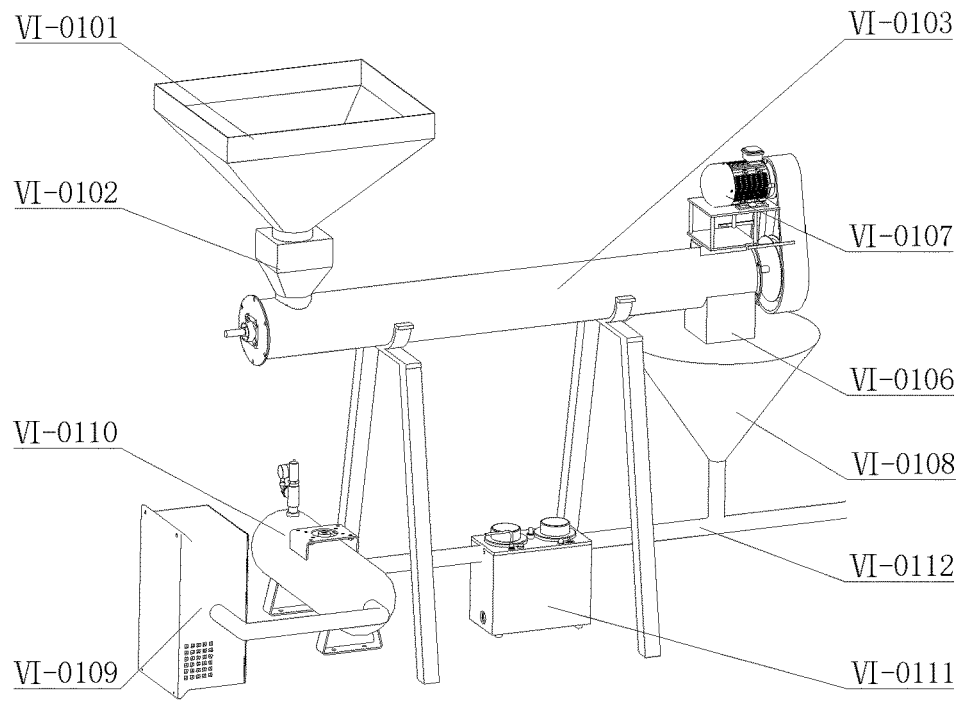
FIG. 16(a) is an axonometric view of a spiral dispersing feeding device in a peanut shell ultra-fine powder classification packaging system.
FIG. 16(b) is a sectional view of a spiral dispersing feeding device in a peanut shell ultra-fine powder classification packaging system.
Figure 16:
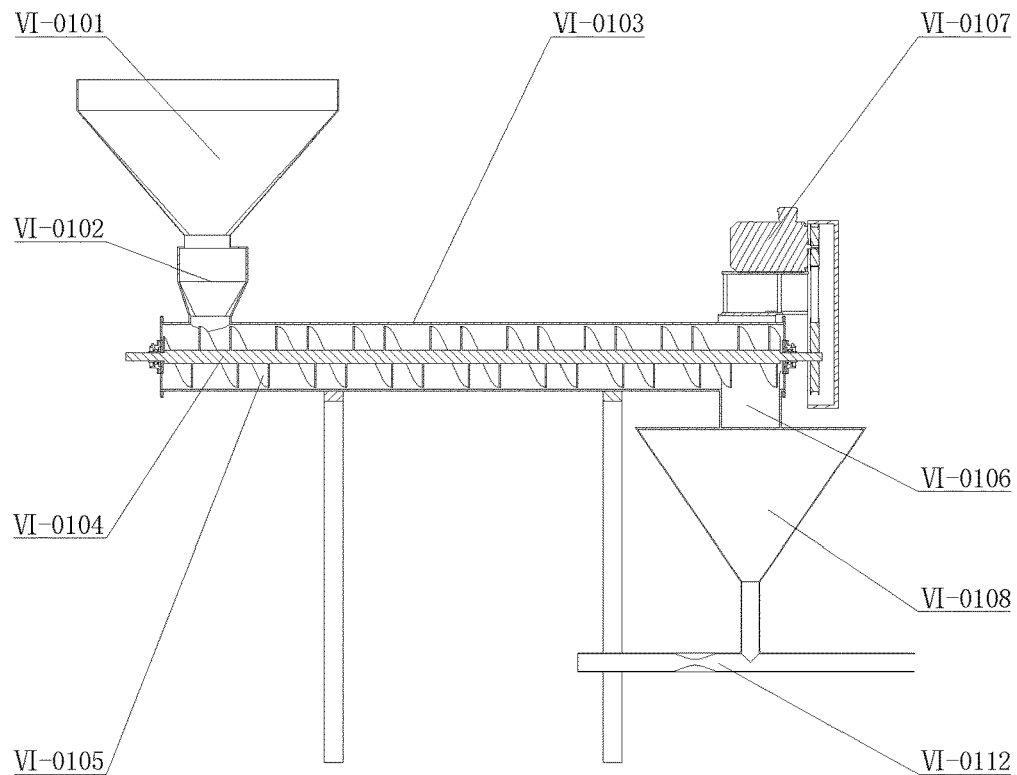

With reference to FIG. 16(*a*) and FIG. 16(*b*), a buffer hopper VI-0102 is arranged below a storage bin VI-0101 and welded to an upper part of a spiral conveying cavity VI-0103, and four walls of the buffer hopper VI-0102 are different in inclination degree to achieve the effect that the powder falls at different speeds to avoid accumulation; a spiral conveying motor VI-0107 drives a double-head screw rod VI-0104, and the powder materials are fully dispersed and sent to a discharging port under the shearing action of double-head screw blades VI-0105. An airflow introduced from an air compressor VI-0109 sequentially passes through a gas storage tank VI-0110 and an air dryer VI-0111 which is configured to fully dry the airflow; the airflow is rapidly accelerated when flowing through a Venturi tube tee VI-0112, at the same time, the ultra-fine peanut shell powder enters the Venturi tube tee VI-0112 under the action of self gravity and a suction effect of negative pressure adsorption, the high-speed airflow achieves a strong impact effect on the ultra-fine powder, and agglomerates are broken and completely dispersed.

Figure 17:
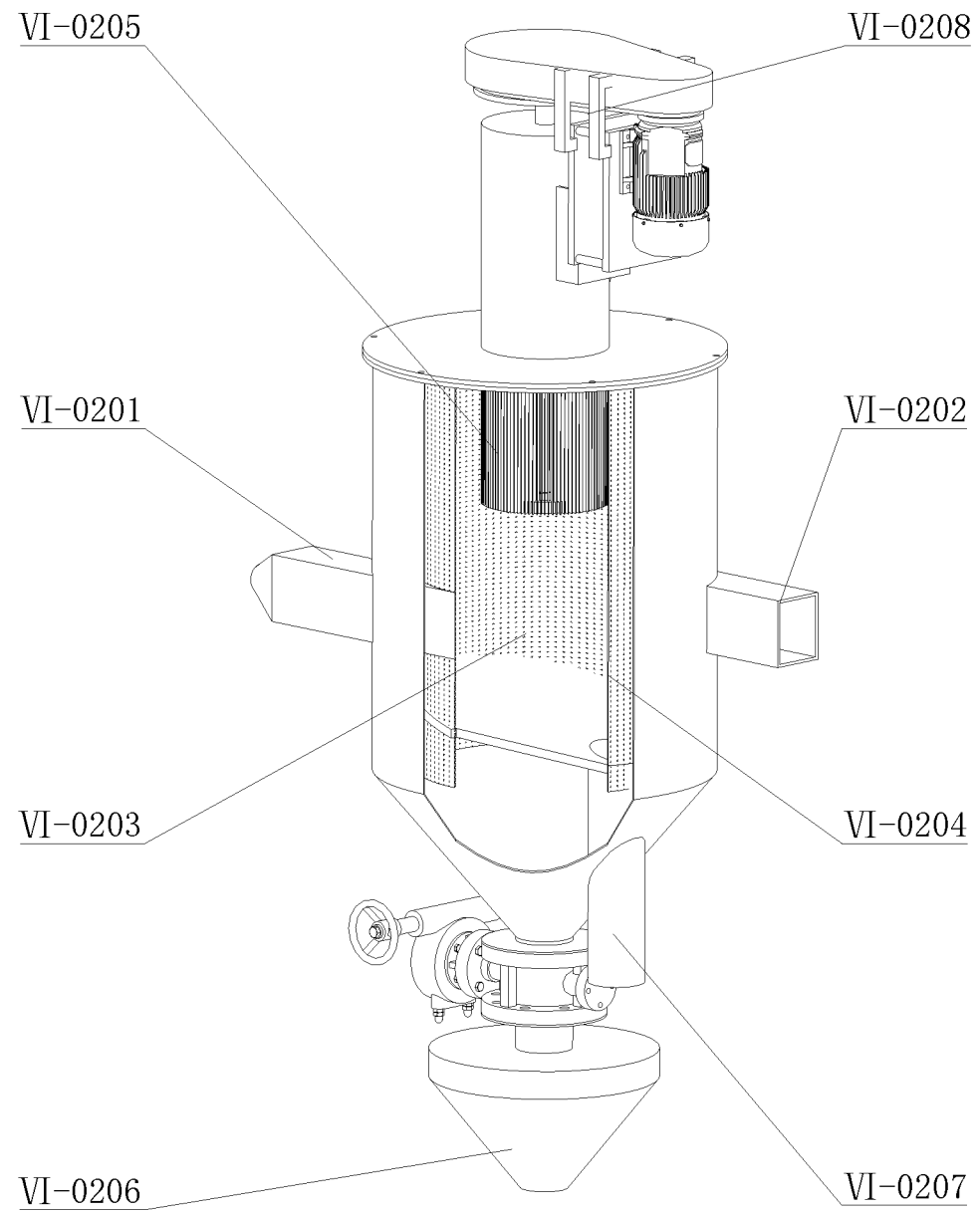
FIG. 17 is a partial sectional view of a cyclone classification device in a peanut shell ultra-fine powder classification packaging system.

With reference to FIG. 17, the ultra-fine powder enters a classification chamber VI-0203 through an air and material inlet VI-0201 under the action of a high-speed airflow, particles with large particle size rotate and fall along a screen mesh VI-0204 under the action of a lower vortex, particles with particle size lower than an aperture pass through the screen mesh and fall along a medium powder discharging pipe VI-0206, particles with particle size larger than the aperture fall to a coarse powder discharging pipe VI-0207 along the screen mesh, entrained particles with large particle size are intercepted by collision under the action of a classification impeller VI-0205 rotating at a high speed, and fine powder falls to a fine powder discharging pipe VI-0208 with the airflow.

Figure 18:
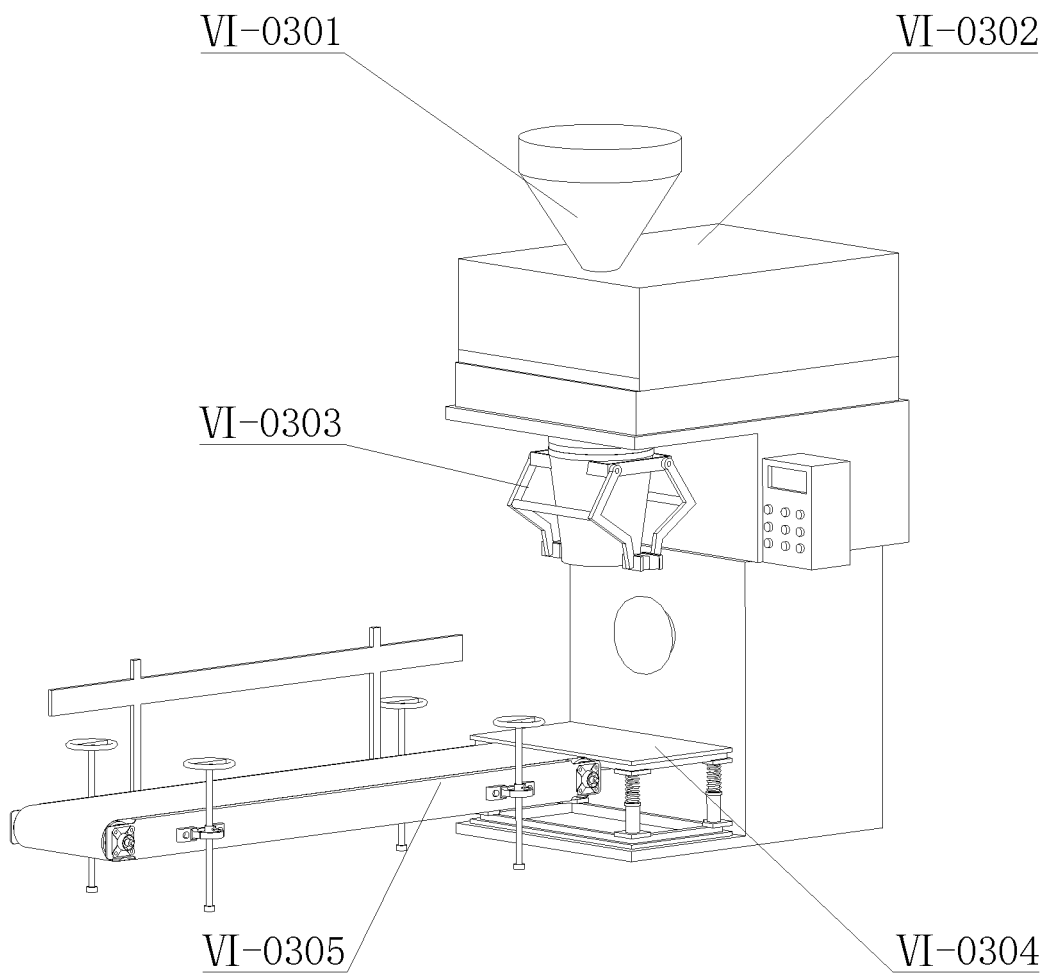
FIG. 18 is an axonometric view of a packaging device in the peanut shell ultra-fine powder classification packaging system.

With reference to FIG. 18, the ultra-fine peanut shell powder obtained after classification enters a weighing mechanism VI-0302 through a feeding hopper VI-0301, and the weighing mechanism is configured to measure the weight of the ultra-fine powder; after quantification is completed, a clamping arm VI-0303 is used for fixing a cloth bag, a vibration compaction mechanism VI-0304 and a beating compaction mechanism VI-0305 are used together to complete compaction, and then the powder is conveyed through a conveyor belt VI-0306 to complete classification packaging of the ultra-fine peanut shell powder.

The foregoing descriptions are merely preferable embodiments of the present disclosure, but are not intended to limit the present disclosure. The present disclosure may include various modifications and changes for a person skilled in the art. Any modification, equivalent replacement, or improvement made within the spirit and principle of the present disclosure shall fall within the protection scope of the present disclosure.

The specific implementations of the present disclosure are described above with reference to the accompanying drawings, but are not intended to limit the protection scope of the present disclosure. A person skilled in the art should understand that various modifications or transformations may be made without creative efforts based on the technical solu- What is chimed is:

1. A peanut whole-process production line, comprising a peanut cleaning system, a shell breaking system, a skin removing system, a peanut kernel classification system, an ultra-fine pulverization system and a classification packaging system; wherein
the peanut cleaning system comprises a feeding port and a vibration screening device, and the vibration screening device at least comprises a first discharging port for discharging peanut pods and a second discharging port for discharging impurities;
the shell breaking system comprises a spiral shell breaking device, is connected with the first discharging port through a first transmission mechanism, and at least comprises two discharging ports, a third discharging port is configured to discharge peanuts with skins, and a fourth discharging port is configured to discharge peanut shells;
a second transmission mechanism is arranged between the skin removing system and the third discharging port;
the peanut kernel classification system comprises a first feeding device and a conveying screening device, and the first feeding device is connected with an outlet of the skin removing system;
the ultra-fine pulverization system comprises a second feeding device, a pulverization device and a classification device distributed sequentially, and the second feeding device is connected with the fourth discharging port; and
the classification packaging system receives ultra-fine peanut shell powder processed by the ultra-fine pulverization system and is configured to screen and package the ultra-fine peanut shell powder.

2. The peanut whole-process production line according to claim 1, wherein the peanut cleaning system comprises a first conveying device, a winnowing device and a vibration screening device distributed sequentially, and the first conveying device is configured to intermittently convey materials to the winnowing device;
the winnowing device is configured to perform negative pressure adsorption on light impurities in the materials when the materials slide down onto the vibration screening device under an action of gravity; and
the vibration screening device comprises multiple stages of screen meshes and two vibration motors with rotating shafts at a certain angle, the multiple stages of screen meshes are subjected to repeated-rotation vibration as a whole, and the multiple stages of screen meshes are installed at different angles respectively.

3. The peanut whole-process production line according to claim 1, wherein the spiral shell breaking device comprises a spiral shell breaking rotor, a periphery of the spiral shell breaking rotor is provided with a grid bar, a spacing between the spiral shell breaking rotor and the grid bar is adjustable and is internally provided with a spiral shell breaking module, and the spiral shell breaking module is configured to squeeze and break peanut shells.

4. The peanut whole-process production line according to claim 3, wherein an output end of the spiral shell breaking device is provided with a first negative pressure adsorption device, and the first negative pressure adsorption device is configured to adsorb peanut shells on a horizontal conveyor belt to separate peanut kernels and the peanut shells.

5. The peanut whole-process production line according to claim 1, wherein the ultra-fine pulverization system comprises a second feeding device, a primary pulverization device, a secondary pulverization device and a classification device;
the second feeding device comprises a feeding pipeline and a rotating member arranged in the feeding pipeline, and the rotating member is connected with a first driving mechanism;
a feeding port of the primary pulverization device is connected with a tail end of the second feeding device, the primary pulverization device comprises a pulverization turntable and a lining plate arranged at an outer side of the pulverization turntable, a plurality of inclined impact pulverization blades are distributed on the pulverization turntable, and the pulverization turntable is connected with a second driving mechanism;
the secondary pulverization device is arranged at an upper side of the primary pulverization device and provided with a pulverization chamber, a plurality of nozzles are distributed around the pulverization chamber, and center lines of the nozzles can converge at the same point; and
the classification device comprises a classification cylinder, the classification cylinder is communicated with the pulverization chamber and located above the pulverization chamber, a turbine classification rotor is arranged in the classification cylinder, a plurality of classification blades are arranged at a circumference of the turbine classification rotor, and the turbine classification rotor is connected with a third driving mechanism.

6. The peanut whole-process production line according to claim 5, wherein a lining plate is distributed on an inner wall of the primary pulverization device, a plurality of arc-shaped grooves are formed in an inner edge of the lining plate;
a lining plate is arranged on an inner wall of the secondary pulverization device, and a surface of the lining plate is sawtooth-shaped; and
the classification device is a centrifugal turbine classification device, comprising a classification cylinder, a turbine classification rotor arranged in the classification cylinder and a driving mechanism, a plurality of classification blades are uniformly distributed at the circumference of the turbine classification rotor, the turbine classification rotor is connected with the driving mechanism through a closed shafting, and a discharging port is formed in an upper part of the classification cylinder.

7. The peanut whole-process production line according to claim 1, wherein a screening device of the classification packaging system comprises a classification cavity, the classification cavity comprises a cylindrical part and a conical part at a lower side of the cylindrical part, an air and material inlet and an air inlet are symmetrically and tangentially formed in a middle position of the cylindrical part, a cylindrical screen mesh classification cavity coaxial with the cylindrical part is formed in the cylindrical part, and a classification impeller coaxial with the cylindrical part is arranged in the screen mesh classification cavity;
a weighing mechanism is configured to weigh classified micropowder; and
a compaction mechanism is configured to bag and beat the weighed micropowder.

8. The peanut whole-process production line according to claim 1, wherein the skin removing system comprises a gas explosion device, a pulling device, a drying device and a second negative pressure adsorption device;

the gas explosion device receives conveyed peanut materials with skins to be removed and is configured to perform gas explosion on the peanut materials under an action of a pressure difference to preliminarily separate peanut kernels and peanut skins;

the pulling device is configured to pull the preliminarily separated peanut kernels and the peanut skins into the drying device;

the drying device is configure to compress outside air to increase a temperature, transfer heat through hot air and heat and dry the preliminarily separated peanut kernels and peanut skins to fully separate the peanut kernels and the peanut skins; and the second negative pressure adsorption device is configured to respectively collect the fully separated peanut kernels and skins with different density and quality in a negative pressure adsorption manner.

9. The peanut whole-process production line according to claim 1, wherein the peanut kernel classification system further comprises a cleaning screening device, and the conveying screening device comprises a conveying screening drum consisting of at least two stages of drums with equal diameters; each stage of drum is uniformly surrounded by a number of round pipes, and gaps between the round pipes of each stage of drum are different; the drum near a feeding port is a first drum, the gap between the round pipes of the first drum is the smallest, and the gap between the round pipes of the latter stage of drum is gradually increased than that between the round pipes of the former stage of drum; and the cleaning screening device is arranged above the conveying screening device; the cleaning screening device undergoes contact beating with the conveying screening drum to achieve cleaning screening of the conveying screening drum.

* * * * *